United States Patent
Wagner

(10) Patent No.: US 9,121,920 B2
(45) Date of Patent: Sep. 1, 2015

(54) METHOD FOR OPERATING AT LEAST ONE SENSOR OF A VEHICLE AND VEHICLE HAVING AT LEAST ONE SENSOR

(75) Inventor: Nikolas Wagner, Eltville-Rauenthal (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 966 days.

(21) Appl. No.: 13/277,329

(22) Filed: Oct. 20, 2011

(65) Prior Publication Data
US 2012/0101681 A1  Apr. 26, 2012

(30) Foreign Application Priority Data
Oct. 21, 2010  (DE) .......................... 10 2010 049 093

(51) Int. Cl.
*G06F 7/00* (2006.01)
*G06F 11/30* (2006.01)
*G01S 5/00* (2006.01)
(Continued)

(52) U.S. Cl.
CPC ............... *G01S 5/0072* (2013.01); *B60T 8/172* (2013.01); *G01D 3/08* (2013.01); *G01S 7/4026* (2013.01); *G01S 7/4972* (2013.01); *G01S 7/52004* (2013.01); *G01S 13/931* (2013.01); *G01S 15/931* (2013.01); *G01S 17/936* (2013.01); *G01S 2007/403* (2013.01); *G01S 2007/4091* (2013.01); *G01S 2013/936* (2013.01); *G01S 2013/9364* (2013.01); *G01S 2013/9367* (2013.01)

(58) Field of Classification Search
USPC ........... 701/29.2, 29.8, 30.5, 30.7, 29.7, 31.4, 701/36; 342/173–174, 118, 125, 70; 356/4.01, 4.03
See application file for complete search history.

(56) References Cited

U.S. PATENT DOCUMENTS 5,670,963 A      9/1997  Kubota et al.
6,931,865 B1 *   8/2005  Van Gilder et al. ............. 62/129
(Continued)

FOREIGN PATENT DOCUMENTS

DE    19711357 C1    5/1998
DE    19934670 A1    12/2000
(Continued)

OTHER PUBLICATIONS

Design of a calibration system for 1D measuring probes; Hermann, G.; Intelligent Engineering Systems (INES), 2012 IEEE 16th International Conference on; DOI: 10.1109/INES.2012.6249822; Publication Year: 2012 , pp. 157-160.*
(Continued)

*Primary Examiner* — Cuong H Nguyen
(74) *Attorney, Agent, or Firm* — Ingrassia Fisher & Lorenz PC

(57) ABSTRACT

A method is provided for operating a sensor of a vehicle. The sensor is configured to detect objects within a detection range and the method includes, but is not limited to detecting an object with the sensor. In addition, a position of the object is determined with data from the sensor. Furthermore, position data emitted by the object is received with a receiving apparatus of the vehicle and the position of the object is determined with the position data. Moreover, the position determined with the sensor is compared with the position of the object and comparative data is determined and an automatic adjustment of the sensor and/or output of a message inside the vehicle is made depending on the comparative data.

18 Claims, 2 Drawing Sheets

(51) Int. Cl.
*G01D 3/08* (2006.01)
*B60T 8/172* (2006.01)
*G01S 7/40* (2006.01)
*G01S 7/497* (2006.01)
*G01S 7/52* (2006.01)
*G01S 13/93* (2006.01)
*G01S 15/93* (2006.01)
*G01S 17/93* (2006.01)

(56) References Cited

U.S. PATENT DOCUMENTS

| | | | |
|---|---|---|---|
| 7,650,239 B2 * | 1/2010 | Samukawa et al. | 701/300 |
| 8,315,759 B2 * | 11/2012 | Bauerle | 701/30.5 |
| 2002/0000921 A1 * | 1/2002 | Hutchinson | 340/942 |
| 2005/0128136 A1 * | 6/2005 | Wittenberg et al. | 342/174 |
| 2005/0151671 A1 * | 7/2005 | Bortolotto | 340/936 |
| 2006/0092073 A1 | 5/2006 | Boecker et al. | |
| 2006/0103927 A1 * | 5/2006 | Samukawa et al. | 359/436 |
| 2010/0057293 A1 | 3/2010 | Hoetzer et al. | |
| 2010/0198513 A1 * | 8/2010 | Zeng et al. | 701/300 |
| 2011/0304840 A1 * | 12/2011 | Hsu et al. | 356/4.03 |
| 2012/0089299 A1 * | 4/2012 | Breed | 701/36 |

FOREIGN PATENT DOCUMENTS

| | | |
|---|---|---|
| DE | 19934197 A1 | 1/2001 |
| DE | 102005013146 A1 | 9/2006 |
| DE | 102008026274 A1 | 12/2009 |
| DE | 102010006084 A1 | 10/2010 |
| EP | 1103823 A2 | 5/2001 |
| JP | 2004-322401 * | 11/2004 |

OTHER PUBLICATIONS

An integrated vision/ultrasonic sensor for 3D target recognition and measurement; Tsung Nan Chou ; Wykes, C.; Image Processing and Its Applications, 1997., Sixth International Conference on; vol. 1; DOI: 10.1049/cp:19970881; Publication Year: 1997 , pp. 189-193 vol. 1.*

The azimuth-spectral portrait of land object and mathematical model of a reflected signal in the radar sensor with inverse synthesis of unfocused antenna aperture; Geyster, S.R. ; Vinogradov, A.E. ; Fam, T.V.; Microwaves, Radar and Wireless Communications, 2002. MIKON-2002. 14th International Conference on; vol. 3;DOI: 10.1109/MIKON.2002.10179.*

Automatic target detection using a ground-based passive acoustic sensor; Quach, A. ; Lo, K.; Information, Decision and Control, 1999. IDC 99. Proceedings. 1999; DOI: 10.1109/IDC.1999.754150; Publication Year: 1999 , pp. 187-192.*

Navigation control for an exploration rover with microwave Doppler sensors (Fabrication of third prototype rover and experiments) Isogai, M. ; Nawa, Y. ; Iijima, T.; Micro-NanoMechatronics and Human Science (MHS), 2014 International Symposium on DOI: 10.1109/MHS.2014.7006068; Publication Year: 2014 , pp. 1-5.*

Automatic calibration of RGBD and thermal cameras; Lussier, J.T. ; Thrun, S.; Intelligent Robots and Systems (IROS 2014), 2014 IEEE/RSJ International Conference on; DOI: 10.1109/IROS.2014.6942598; Publication Year: 2014 , pp. 451-458.*

German Patent Office, German Search Report for Application No. 102010049093.8, dated Feb. 10, 2011.

UK IPO, British Search Report for Application No. 1117238.4, dated Jan. 24, 2012.

German Patent Office, German Search Report for Application No. 102010049091.1, dated Feb. 10, 2011.

UK IPO, British Search Report for Application No. 1117237.6, dated Jan. 24, 2012.

* cited by examiner

METHOD FOR OPERATING AT LEAST ONE SENSOR OF A VEHICLE AND VEHICLE HAVING AT LEAST ONE SENSOR

CROSS-REFERENCE TO RELATED APPLICATION

This application claims priority to German Patent Application No. 102010049093.8, filed Oct. 21, 2010, which is incorporated herein by reference in its entirety.

TECHNICAL FIELD

The technical field relates to a method for operating at least one sensor of a vehicle, a vehicle having at least one sensor, a computer program product, and a computer-readable medium.

BACKGROUND

Known from EP 1 103 823 A2 is a method for adjusting a sensor of a vehicle to determine the distance and the direction of objects relative to the vehicle, in which the distance and directional angle of objects relative to the vehicle is detected continuously during the journey with the aid of the sensor, in which the objects are tracked in time and direction vectors are calculated, in which the relative position of the roadway with respect to the vehicle is determined from the direction vectors and from this the measured direction of travel is determined, in which the direction of travel of the vehicle is calculated continuously with the aid of a yaw-rate sensor and the vehicle speed, in which the difference between the directions of travel determined from the measured values of the sensor and the directions of travel determined by means of the yaw-rate sensor and the vehicle speed are calculated, and in which the angle misalignment of the sensor is calculated from the differences of the directions of travel. A sensor is provided for executing the method, whose adjusting means can be set automatically by drive means.

It is at least on object to provide a method for operating at least one sensor of a vehicle, a vehicle having at least one sensor, a computer program product, and a computer-readable medium, which can identify a loss of adjustment of the sensor by means of technology or components provided in the vehicle in a simple manner. In addition, other objects, desirable features and characteristics will become apparent from the subsequent summary and detailed description, and the appended claims, taken in conjunction with the accompanying drawings and this background.

SUMMARY

A method is provided for operating at least one sensor of a vehicle, where the at least one sensor is configured for detecting objects within a detection range comprises the following steps. At least one object is detected by means of the at least one sensor. In addition, a position of the at least one object is determined by means of the data determined by the at least one sensor. Furthermore, position data emitted or transmitted by the at least one object is received by means of a receiving apparatus of the vehicle. In addition, the position of the at least one object is determined by means of the position data received from the at least one object. In addition, the position determined by means of the at least one sensor is compared with the position of the at least one object determined by means of the received position data and comparative data are determined. An automatic adjustment of the at least one sensor and/or output of a message inside the vehicle are further made depending on the determined comparative data.

The method for operating the at least one sensor of the vehicle whereby the position determined by means of the at least one sensor is compared with the position of the at least one object determined by means of the received position data and comparative data are determined, and an automatic adjustment of the at least one sensor and/or output of a message within the vehicle is made depending on the determined comparative data, enables a loss of adjustment of the at least one sensor to be identified and the sensor automatically adjusted and/or enables the attention of the vehicle occupants, in particular the vehicle driver, to the drawn to the loss of adjustment. Technology in the form of the receiving apparatus already provided in the vehicle is thereby advantageously used to detect the loss of adjustment. The application thereby starts from the consideration that the position of the at least one object can be ascertained or determined both by means of data determined by the at least one sensor and also by means of the position data received from the at least one object and as a result there is a redundancy. The present method utilizes this redundancy in an advantageous manner.

The position of the at least one object is preferably a position relative to the vehicle. This has the advantage that a relative position to the vehicle can be determined in a particularly simple manner by means of the data determined by the at least one sensor.

In one embodiment the method, the determination of the position of the at least one object by means of data determined by the at least one sensor includes determining a distance of the at least one object from the vehicle. This in turn has the advantage that the distance of the at least one object from the vehicle can be determined simply by means of the data determined by the at least one sensor.

The receiving apparatus is preferably part of a vehicle-to-vehicle communication apparatus and/or a vehicle-to-infrastructure communication apparatus of the vehicle. Corresponding communication apparatus are increasingly provided for vehicles, whereby the receiving apparatus can advantageously be integrated in these communication apparatuses.

The adjustment of the at least one sensor can include an adaptation of a position of the at least one sensor. Furthermore, the adjustment of the at least one sensor can include an adaptation of an angular alignment of the at least one sensor, in particular an adaptation of an angular component in a longitudinal direction of the vehicle, i.e., an adaptation of an alignment of the sensor in the azimuthal direction. The adaptation of the position of the at least one sensor and/or the angular alignment of the at least one sensor is accomplished in a further embodiment by means of at least one adjusting apparatus that is configured for adapting the position or the angular alignment of the at least one sensor by means of the determined comparative data.

In a further embodiment, the determination of the comparative data includes a determination of a deviation of the position determined by means of the at least one sensor from the position of the at least one object determined by means of the received position data. The adjustment of the at least one sensor includes incorporating the determined deviation in an evaluation of measurement data of the at least one sensor.

The automatic adjustment of the at least one sensor can therefore include a mechanical adjustment and/or a software adjustment or a software adaptation and thus advantageously be adapted to the respective conditions of the sensor or the vehicle.

The at least one sensor is preferably configured as an acoustic sensor, in particular as an ultrasound sensor, or as an electromagnetic sensor, in particular a run-time-based sensor, for example as a radar sensor or as a lidar sensor, or as an optical sensor, for example as an optical camera. The said sensors, which are also designated environment sensors, are increasingly provided for vehicles and are particularly suited for detecting objects in the environment of the vehicle.

In a further embodiment of the method, a determination of a position of the vehicle is additionally made by means of a position determining apparatus of the vehicle, for example, by means of a navigation device of the vehicle. The determination of the position of the at least one object is preferably made in this embodiment by means of the position data received from the at least one object and by means of the determined position of the vehicle. This has the advantage that a position of the at least one object thus determined can have an accuracy in the range of approximately 10 cm to approximately 15 cm, relative to a longitudinal direction and a transverse direction of the vehicle, whereby the adjustment of the at least one sensor can be carried out particularly exactly.

In an embodiment, the data determined by the at least one sensor and/or the position data emitted by the at least one object is additionally provided with information about the time of its determination. As a result, a temporal synchronization of the determined data with the position data and therefore a temporal synchronization of the position determined by means of the at least one sensor with the position determined by means of the received position data can be reliably accomplished.

Furthermore, the position data emitted by the at least one object can be additionally provided with information about the dimensions of the at least one object. As a result, the position of the at least one object can advantageously be determined very precisely by means of the position data received from the at least one object.

In s further embodiment of the method, a determination of a speed of the at least one object is additionally accomplished by means of the data determined by the at least one sensor and/or by means of the position data received by the at least one object. As a result, relevant objects, for example another vehicle driving in front of the vehicle, can be distinguished in a particularly simple manner from irrelevant objects in the surroundings of the vehicle.

A vehicle is also provided that comprises at least one sensor, where the at least one sensor is configured for detecting at least one object within a detection range. The vehicle further comprises a first position determining apparatus configured for determining a position of the at least one object by means of data determined by the at least one sensor. Furthermore, the vehicle comprises a receiving apparatus configured for receiving position data emitted by the at least one object and a second position determining apparatus configured for determining the position of the at least one object by means of the position data received from the at least one object. Furthermore, the vehicle comprises a comparing apparatus configured for comparing the position determined by means of the at least one sensor with the position of the at least one object determined by means of the position data, and for determining comparative data. In addition, the vehicle has an adjustment apparatus configured for automatic adjustment of the at least one sensor and/or an output apparatus configured for outputting a message inside the vehicle depending on the determined comparative data.

A computer program product is also provided that, when it is implemented on a processing unit of a vehicle, instructs the processing unit to execute the following steps. The processing unit is instructed to detect at least one object by means of at least one sensor of the vehicle. Furthermore the processing unit is instructed to determine a position of the at least one object by means of the data determined by the at least one sensor. In addition, the processing unit is instructed to receive position data emitted by the at least one object by means of a receiving apparatus of the vehicle and to determine the position of the at least one object by means of the position data received from the at least one object. In addition, the processing unit is instructed to compare the position determined by means of the at least one sensor with the position of the at least one object determined by means of the received position data and to determine comparative data. Furthermore the processing unit is instructed to execute an automatic adjustment of the at least one sensor and/or output of a message inside the vehicle depending on the determined comparative data.

A computer-readable medium is also provided on which a computer program product according to the said embodiment is stored.

The vehicle, the computer program product, and the computer-readable medium exhibit the advantages already specified in connection with the method, which will not be listed again at this point to avoid repetitions. The vehicle in the aforesaid embodiments is preferably a motor vehicle, in particular an automobile or a truck.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
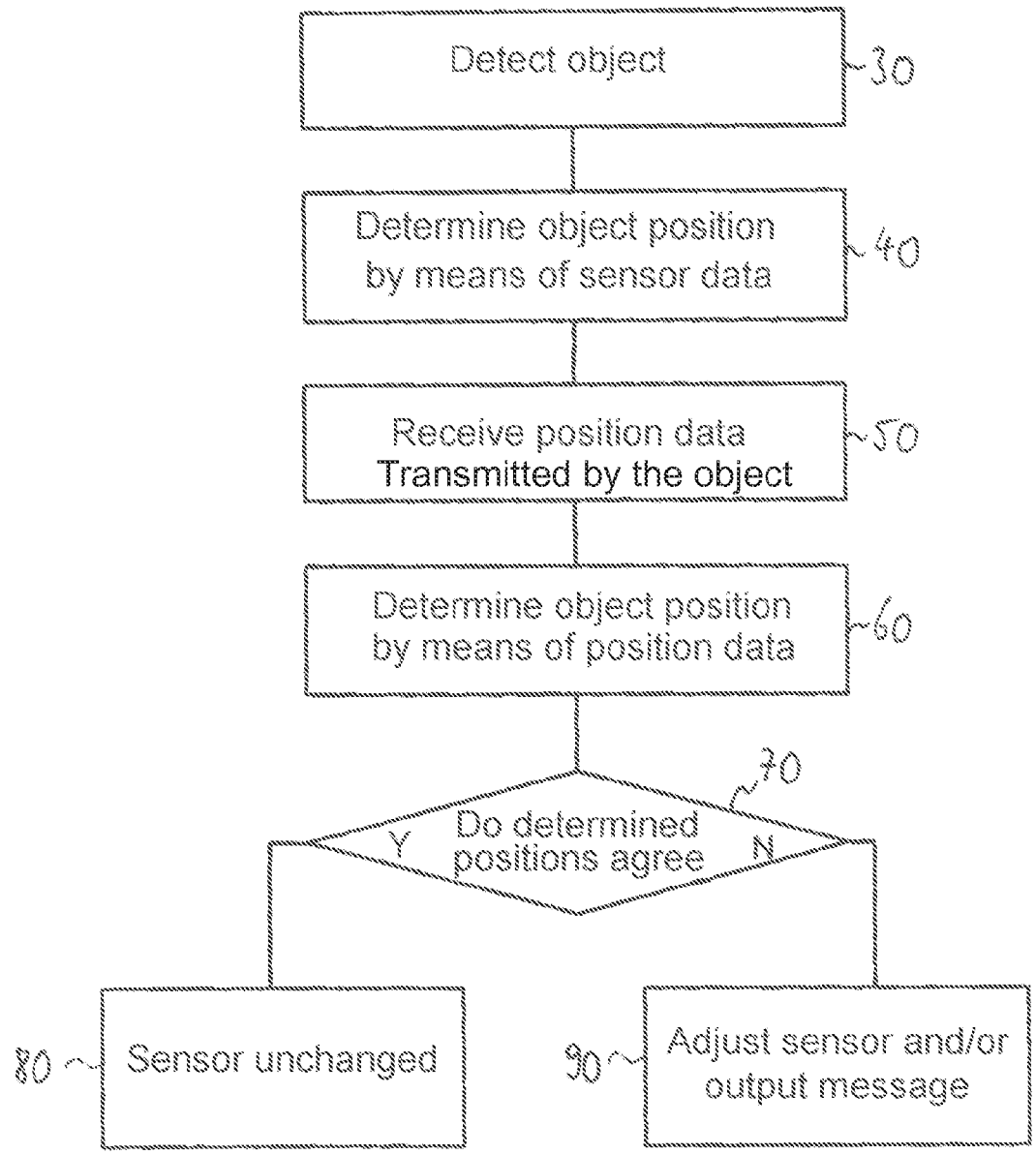
FIG. 1 shows a flow diagram of a method for operating at least one sensor of a vehicle according to one embodiment.

FIG. 1 shows a flow diagram of a method for operating at least one sensor of a vehicle, where the at least one sensor is configured for detecting objects within a detection range, according to one embodiment of the application. The at least one sensor is typically configured as an acoustic sensor, in particular as an ultrasound sensor, or as an electromagnetic sensor, in particular a run-time-based sensor, for example as a radar sensor or as a lidar sensor, or as an optical sensor, for example as an optical camera. The vehicle is preferably a motor vehicle, in particular an automobile.

In the embodiment shown in a step 30 at least one object is detected by means of the at least one sensor. Furthermore, in a step 40, a position of the at least one object is determined by means of data determined by means of the at least one sensor. In a step 50 position data emitted or transmitted by the at least one object are received by means of a receiving apparatus of the vehicle, where the receiving apparatus is preferably part of a vehicle-to-vehicle communication apparatus and/or a vehicle-to-infrastructure communication apparatus of the vehicle. In a step 60 the position of the at least one object is determined by means of position data received from the at least one object.

In a further embodiment the detection of the at least one object by means of the at least one sensor and the determination of the position of the at least one object by means of the data determined by the at least one sensor can be accomplished following receipt of the position data by means of the receiving apparatus of the vehicle and the determination of a position of the at least one object by means of the position data received from the at least one object. This means that steps 30 and 40 can be executed after steps 50 and 60.

In a step 70 the position determined by means of the at least one sensor is compared with the position of the at least one object determined by means of the received position data. In addition, comparative data are determined To this end, in the embodiment shown it is determined whether the position determined by means of the at least one sensor agrees with the position of the at least one object determined by means of the received position data. In this context "agree" can also mean that the position determined by means of the at least one sensor deviates by less than a predetermined threshold value from the position determined by means of the position data received from the at least one object.

If the determined positions agree, the at least one sensor of the vehicle remains unchanged, as shown in a step 80. In addition, a confidence level for measurement data of the at least one sensor in one or more driver assistance systems of the vehicle can be increased. If the determined positions do not agree, in a step 90 an automatic adjustment of the at least one sensor and/or an output of a message inside the vehicle is made. The adjustment of the at least one sensor can include an adaptation of a position and/or an angular alignment, in particular an adaptation of an angular component in a longitudinal direction of the vehicle, i.e., an adaptation of an alignment of the sensor in the azimuthal direction. Additionally or alternatively, a determined deviation between the position determined by means of the at least one sensor and the position determined by means of the received position data can be incorporated in an evaluation of the measurement data of the at least one sensor. In addition, the data determined by the at least one sensor and/or the position data emitted by the at least one object can be provided with information about the time of its determination, i.e., with a time stamp, for example, with a time stamp of a CAN bus system.

Figure 2:
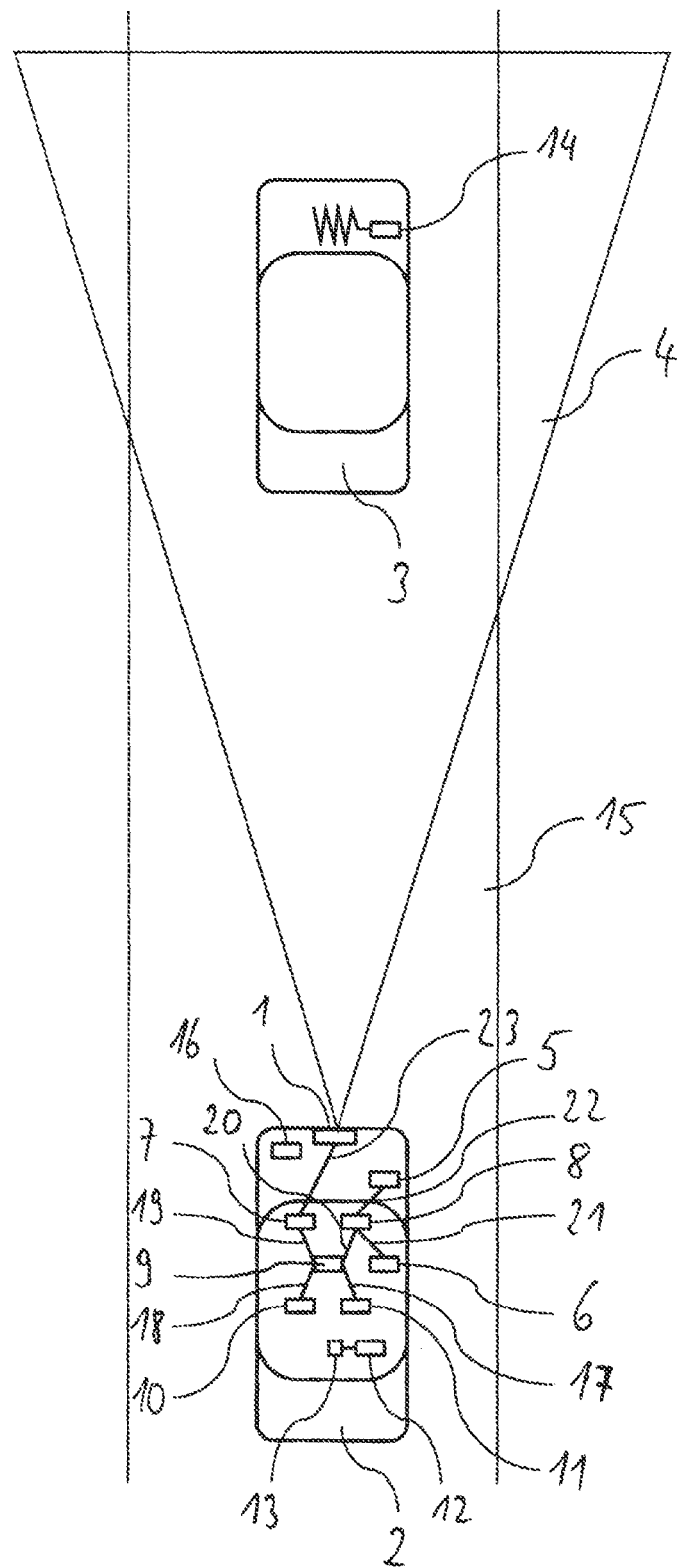
FIG. 2 shows a vehicle having a sensor according to one embodiment.

FIG. 2 shows a vehicle 2 with a sensor 1 according to one embodiment. In the embodiment shown the vehicle 2 is a motor vehicle in the form of an automobile. The sensor 1 is configured to detect objects within a schematically depicted detection range 4. For example, the sensor 1 is a radar sensor or a lidar sensor. The vehicle 2 is located on a roadway 15 which in the embodiment shown is single-track in the direction of travel of the vehicle 2. In front of the vehicle 2 an object 3 in the form of another automobile is located on the roadway 15 within the detection range 4 of the sensor 1. The other vehicle is therefore detected by the sensor 1.

The position of the detected object 3 is determined by a first position determining apparatus 7 of the vehicle 2 which is configured to determine a position of the object 3 by means of data determined by the sensor 1. For this purpose the first position determining apparatus 7 is connected to the sensor 1 via a signal line 23. Furthermore the vehicle 2 has a receiving apparatus 5 configured for receiving position data emitted or transmitted by a transmitting apparatus 14 of the object 3. The receiving apparatus 5 is part of a vehicle-to-vehicle or a vehicle-to-infrastructure communication apparatus of the vehicle 2 and the transmitting apparatus 14 is part of a vehicle-to-vehicle or a vehicle-to-infrastructure communication apparatus of the other vehicle, i.e., of the object 3.

The vehicle 2 additionally has a second position determining apparatus 8 configured for determining the position of the object 3 by means of the received position data. For this purpose the second position determining apparatus 8 is connected to the receiving apparatus 5 via a connecting line 22. In the embodiment shown the second position determining apparatus 8 is configured to determine the position of the object 3 by means of the received position data and by means of a position of the vehicle 2 determined by a position determining apparatus 6 of the vehicle 2. The position determining apparatus 6 is thereby connected to the second position determining apparatus 8 via a connecting line 21.

Furthermore the vehicle 2 has a comparing apparatus 9 configured for comparing the position determined by means of the sensor 1 with the position of the object 3 determined by means of the received position data, and for determining comparative data. For this purpose the comparing apparatus 9 is connected to the first position determining apparatus 7 via a connecting line 19 and to the second position determining apparatus 8 via a connecting line 20.

In the embodiment shown, the vehicle 2 additionally has an adjustment apparatus 10 configured for automatic adjustment of the sensor 1 depending on the determined comparative data and an output apparatus 11 configured for outputting a message inside the vehicle 2 depending on the determined comparative data. The adjustment apparatus 10 is thereby connected via a connecting line 18 and the output apparatus 11 is connected via a connecting line 17 to the comparing apparatus 9.

In the embodiment shown the adjustment apparatus 10 can make a mechanical adjustment of the sensor 1 by means of an actuator 16. Additionally or alternatively the adjustment apparatus 10 can make a software adjustment of the sensor 1, i.e., it can take into account a deviation between the determined positions in an evaluation of the measurement data of the sensor 1. The output apparatus 11 is preferably configured as an acoustic and/or an optical output apparatus and can, for example, be part of a combi-instrument and/or an information and entertainment system of the vehicle 2.

Furthermore, in the embodiment shown the vehicle 2 has a processing unit 12 and a computer-readable medium 13, where a computer program product is stored on the computer-readable medium 13, which when executed on the processing unit 12, instructs the processing unit to perform the said steps of the method, in particular the embodiment shown in FIG. 1, by means of the said elements. To this end, the processing unit 12 is connected directly or indirectly to the said components in a manner not shown in detail.

The embodiment shown starts from the consideration that systems for the active safety of vehicles are in particular based on so-called environment sensors such as, for example, radar sensors, lidar sensors, and/or optical cameras which measure the surroundings relative to the vehicle, e.g., in the form of distances and angles. For this purpose an accurate alignment of the sensor in the azimuthal and elevation direction, for example, along the vehicle longitudinal axis is required. This is typically accomplished during manufacture of the vehicle at the end of the production line in the factory or in a workshop during maintenance work or repairs following accidents. The calibration at the end of the line and in the workshop requires special tools and equipment having a high space requirement and a high time expenditure and is therefore costly. Another problem is the loss of calibration of the sensors during operation, for example, due to minor accidents, faulty or loose screw or adhesive connections or similar.

By means of systems having so-called vehicle-to-vehicle communication, also known as V2V communication ("vehicle to vehicle" communication) or vehicle-to-infrastructure communication, also known as V2R communication ("vehicle to roadside" communication), the relative position of two vehicles to one another or the relative position of one vehicle to an object of the traffic infrastructure can also be determined if a vehicle is fitted with V2V and with environment sensors, the relative position to a preceding vehicle, also fitted with V2V is therefore determined both via V2V and by the environment sensor and there is a redundancy. The said embodiment advantageously uses this redundancy.

For example, on a fairly long straight without a multilane own roadway, after some time or travel distance, a vehicle communicating by V2V can be uniquely assigned to an object identified by environment sensor. By comparing the relative position measured by the environment sensor with that determined by V2V, sensor errors due to loss of adjustment can be identified and possibly automatically compensated, i.e., a software or mechanical adjustment can be carried out or the attention of the vehicle occupants, particularly the driver, can be drawn to this. The accuracy attainable by V2V is typically in the range of 10 cm to 15 cm in the longitudinal and in the transverse direction of the vehicle, which is sufficient. The embodiment shown therefore enables an identification of loss of adjustment and an adjustment of environment sensor by using additional V2V equipment and consequently a use of technology provided in the vehicle to avoid sensor errors in active safety systems. At the same time, the calibration at the end of the production line and in the workshop can be simplified by the method according to the application since merely a pre-adjustment is made there and a precise self-adjustment is made during travel of the vehicle by the automatic adjustment of the sensor.

Although at least one exemplary embodiment has been shown in the preceding description, various amendments and modifications can be made. The said embodiments are merely examples and are not intended to restrict the range of validity, the applicability, or the configuration in any way. On the contrary the preceding description provides the person skilled in the art with a plan for implementing at least one exemplary embodiment, where numerous amendments can be made in the function and the arrangement of elements described in an exemplary embodiment without departing from the scope of protection of the appended claims and their legal equivalent.

What is claimed is:

1. A method for operating at least one sensor of a vehicle, the at least one sensor is configured for detecting objects within a detection range and the method comprises:
    detecting at least one object with the at least one sensor;
    determining a first position of at least one object with sensor data determined by the at least one sensor;
    receiving position data transmitted by the at least one object with a receiving apparatus of the vehicle, wherein the position data is independent of the sensor data;
    determining a second position of the at least one object with the position data received from the at least one object;
    comparing the first position of the at least one object determined by the at least one sensor and the second position of the at least one object determined with the received position data to provide determined comparative data; and
    automatically adjusting the at least one sensor based on the determined comparative data.

2. The method according to claim 1, further comprising generating a message inside the vehicle depending on the determined comparative data.

3. The method according to claim 1, wherein the first position of the at least one object is a position relative to the vehicle.

4. The method according to claim 1, wherein the determining the first position of the at least one object with the at least one sensor comprises determining a distance of the at least one object from the vehicle.

5. The method according to claim 2, wherein the adjusting of the at least one sensor comprises adapting an angular alignment of the at least one sensor.

6. The method according to claim 2,
    wherein the determining of the determined comparative data comprises determining a deviation of the first position determined with the at least one sensor from the second position of the at least one object determined with the received position data, and
    wherein the adjusting of the at least one sensor comprises incorporating the deviation in an evaluation of measurement data of the at least one sensor.

7. The method according to claim 1, further comprising determining a third position of the vehicle with a position determining apparatus of the vehicle.

8. The method according to claim 1, further comprising providing the position data transmitted by the at least one object with information about dimensions of the at least one object.

9. A vehicle, comprising:
    at least one sensor is configured to detect an object within a detection range;
    a first position determining apparatus configured to determine a first position of the at least one object with sensor data determined by the at least one sensor;
    a receiving apparatus configured to receive position data transmitted by the at least one object, wherein the position data is independent of the sensor data;
    a second position determining apparatus configured to determine a second position of the at least one object with the position data received from the at least one object;
    a comparing apparatus configured to compare the first position determined with the at least one sensor with the second position of the at least one object determined with the position data, and further configured to provide determined comparative data; and
    an adjustment apparatus configured to automatically adjustment the at least one sensor based on the determined comparative data.

10. The vehicle according to claim 9, further comprising an output apparatus configured to generate a message inside the vehicle depending on the determined comparative data.

11. A non-transitory computer readable medium embodying a computer program product, said computer program product comprising:
    an operating program for operating at least one sensor of a vehicle, the at least one sensor is configured for detecting objects within a detection range, the operating program configured to:
    detect at least one object with the at least one sensor;
    determine a first position of the at least one object with sensor data determined by the at least one sensor;
    receive position data transmitted by the at least one object with a receiving apparatus of the vehicle, wherein the position data is independent of the sensor data;
    determine a second position of the at least one object with the position data received from the at least one object;
    compare the first position determined with the at least one sensor and the second position of the at least one object determined with the received position data to provide determined comparative data; and automatically adjust the at least one sensor based on the determined comparative data.

12. The non-transitory computer readable medium embodying the computer program product according to claim 11, the operating program further configured to generate a message inside the vehicle depending on the determined comparative data.

13. The non-transitory computer readable medium embodying the computer program product according to claim 11, wherein the first position of the at least one object is a position relative to the vehicle.

14. The non-transitory computer readable medium embodying the computer program product according to claim 11, wherein the operating program is further configured to determine the first position of the at least one object with the at least one sensor that includes determining a distance of the at least one object from the vehicle.

15. The non-transitory computer readable medium embodying the computer program product according to claim 12, wherein the automatically adjust of the at least one sensor comprises adapting an angular alignment of the at least one sensor.

16. The non-transitory computer readable medium embodying the computer program product according to claim 12, wherein the determining of the determined comparative data comprises determining a deviation of the first position determined with the at least one sensor from the second position of the at least one object determined with the received position data, and wherein the adjusting of the at least one sensor comprises incorporating the deviation in an evaluation of measurement data of the at least one sensor.

17. The non-transitory computer readable medium embodying the computer program product according to claim 12, further comprising determining a third position of the vehicle with a position determining apparatus of the vehicle.

18. The non-transitory computer readable medium embodying the computer program product according to claim 12, the operating program further configured to provide the position data transmitted by the at least one object with information about dimensions of the at least one object.

* * * * *